United States Patent [19]
Bodner et al.

[11] 3,880,639
[45] Apr. 29, 1975

[54] SULFUR RECOVERY FROM GLASS MELTING AND REFINING

[75] Inventors: John J. Bodner; Everett F. Grubb; Kenneth J. McCormack, all of Toledo; Ronald H. Moore, Sylvania, all of Ohio

[73] Assignee: Owens-Illinois, Inc., Toledo, Ohio

[22] Filed: Dec. 13, 1972

[21] Appl. No.: 314,568

[52] U.S. Cl. .................. 65/134; 65/135; 423/242
[51] Int. Cl. ............................................. C03b 5/16
[58] Field of Search ............ 432/13, 5; 65/134, 135, 65/335; 423/242, 512, 554

[56] References Cited
UNITED STATES PATENTS

| | | | |
|---|---|---|---|
| 3,350,213 | 10/1967 | Peyches | 432/13 |
| 3,375,095 | 3/1968 | Poole | 65/134 |
| 3,459,411 | 8/1969 | Jacobs | 432/13 |
| 3,460,926 | 8/1969 | Weaver | 65/60 X |
| 3,511,629 | 5/1970 | Bauer et al. | 65/134 |
| 3,607,190 | 9/1971 | Penberthy | 65/134 |
| 3,615,767 | 10/1971 | Conroy et al. | 65/134 |
| 3,632,305 | 1/1972 | Hardison | 423/242 |
| 3,704,095 | 11/1972 | Nicklin | 423/242 |
| 3,788,832 | 1/1974 | Nesbitt et al. | 65/134 |

Primary Examiner—S. Leon Bashore
Assistant Examiner—Kenneth M. Schor
Attorney, Agent, or Firm—Howard G. Bruss, Jr.; E. J. Holler

[57] ABSTRACT

Disclosed is a method for pollution abatement in glass melting and refining operations by preventing gaseous sulfur compounds and other objectionable materials from leaving the glass melting furnace in the effluent gas by countercurrently heat exchanging and reacting such effluent gas with agglomerated, alkaline glass batch. The gaseous sulfur compounds are stripped from the effluent gas as a reaction product with the alkaline glass batch. As a result, the agglomerated glass batch contains sulfur in a form which facilitates melting and refining, and is prereacted and preheated thereby permitting a substantial lowering of the temperature at which the glass furnace can be operated.

10 Claims, 1 Drawing Figure

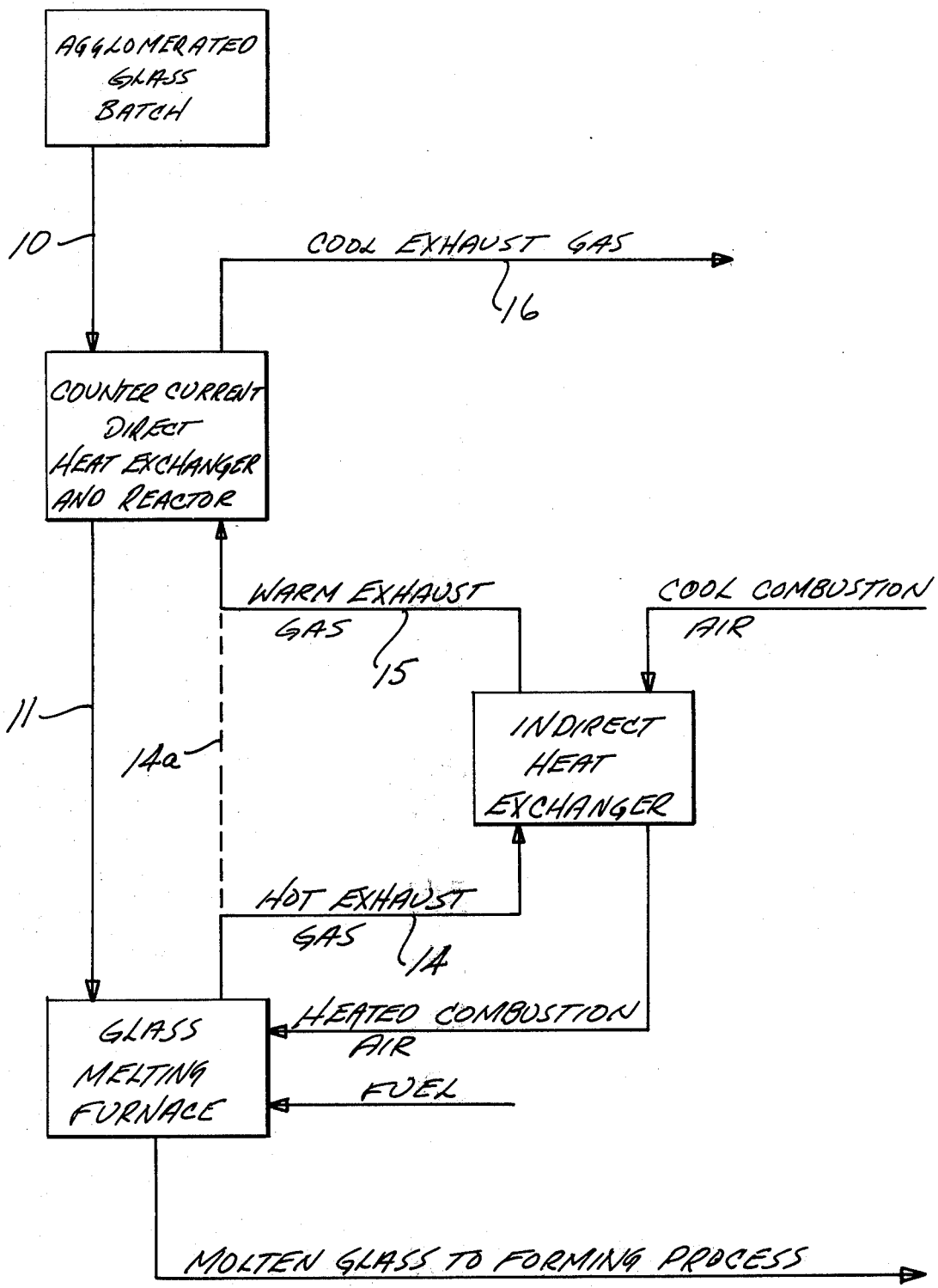

SULFUR RECOVERY FROM GLASS MELTING AND REFINING

Sulfur compounds are common ingredients in glassmaking operations and are used as refining agents and colorants in conventional glass compositions. This is particularly true in the case of amber, green, and flint soda-lime glass compositions. Additionally, sulfur oxides are introduced into combustion heated glass melting furnaces by the combustion of sulfur-containing fuels. This is particularly true in the case of fuel oils which often contain up to 1% or more by weight of sulfur.

Many glass compositions have the capacity to retain minor concentrations of sulfur compounds. Unfortunately, the chemical equilibrium conditions that exist in a glass melting furnace do not permit all of the sulfur compounds introduced with the glass batch and combustion fuel to be assimilated in the molten glass leaving the glass melting furnace. Consequently, a significant proportion of the sulfur compounds introduced into the glass melting furnace leave the furnace as $SO_x$ (e.g., $SO_2$ and $SO_3$) in the effluent or exhaust gases. In the past, it has been necessary to resort to chemical scrubbers to remove this $SO_x$ from the exhaust gas stream.

The present invention provides for the recovery and reuse of sulfur compounds from the exhaust gas as well as preheating and prereacting the glass batch while substantially lowering the temperatures at which a given glass batch can be melted and refined (which in turn aids substantially in lowering oxides of nitrogen and particulates emissions from the glass furnace) by reacting such sulfur oxide-containing gases with an agglomerated, alkaline glass batch at a temperature and for a time sufficient to remove at least about 90% by weight of the sulfur and preferably substantially all of the sulfur from the exhaust gas in the form an in situ reaction product in the agglomerated, alkaline batch. This reaction product contains sulfur in a chemically combined form (usually as a sulfate salt) which facilitates melting and refining of the glass batch to the extent that the batch can usually be melted and refined at 100°F. to 200°F. lower than the temperature that the same batch composition could be melted and refined if it had not been prereacted and preheated with the sulfur oxide-containing effluent gases. Sulfur as used herein includes sulfur chemically combined as in sulfates or sulfur oxides.

The art has long recognized that the exhaust gas from the melting of glasses in a combustion heated glass melting furnace contained a large amount of heat which can be efficiently recovered and reused in the glass melting operation and, in fact, many attempts have been made to recover such heat by contact with the incoming glass batch materials. For instance, U.S. Pat. No. 3,459,411 discloses a method for preheating agglomerated glass batch materials by heat exchange with hot gas. The hot gas may be exhaust gas from the furnace. FIG. 2 of this patent illustrates a system where exhaust gases taken directly from the glass melting furnace are passed contercurrently through a bed of agglomerated glass batch. The patent also discloses that the hot gas used for preheating the agglomerated batch can be the hot gases from the furnace which have previously been used for heating the combustion air for the furnace. This patent does not disclose the use of sulfur-containing batch components, and emission and control of sulfur is not discussed.

U.S. Pat. No. 1,815,890 discloses a method of preheating the glass batch materials with hot exhaust gases from the glass melting furnace prior to introducing the batch materials to the glass furnace. FIG. 3 of this patent shows that exhaust gases from the combustion heated glass melting furnace pass through a conventional regenerator system before being countercurrently contacted with glass batch ingredients. Sulfur recovery and pollution abatement are not discussed.

U.S. Pat. No. 3,172,648 discloses a method of preheating vitrifiable batch materials by countercurrently contacting them with hot fumes coming from the furnace. The materials are contacted with the fumes, and the temperature is raised close to the fritting point of the batch. There is no discussion of recovering sulfur from the fumes although Column 4, Lines 50 to 60, states that sulfuric components may be condensed when the fumes are cooled below their dew point.

U.S. Pat. No. 2,957,640 discloses a glass melting method wherein briquetted batch materials are preheated to a temperature of about 1,000°F. by countercurrent heat exchange with exhaust gases from the furnace. FIG. 1 of this patent shows that the exhaust gases from the furnace are used in a conventional regenerative heat exchange process for preheating combustion air prior to contact with the briquetted batch. There is no discussion of pollution abatement or sulfur recovery.

U.S. Pat. No. 2,634,555 concerns the so-called "submerged burner process" wherein the combustion occurs below the surface of the molten glass. This patent is of interest because the combustion gases leaving the burner pass in countercurrent contact with incoming batch materials. After contacting the batch materials, the exhaust gases are used to preheat the incoming combustion air by indirect heat exchange.

U.S. Pat. No. 3,607,190 discloses preheating incoming batch materials in a rotary preheating kiln using combustion gases as a heat source. This patent emphasizes that a separate burner is used to supply such combustion gases although it is stated that combustion gases from the melting furnace can be used as a source of additional heat. No mention is made of sulfur recovery for pollution abatement.

U.S. Pat. No. 1,610,377 discloses an electric melting furnace wherein the hot gases leaving the furnace pass in countercurrent heat exchange relation with incoming batch materials. This furnace is electrically heated so there are no problems in disposal of combustion gases.

U.S. Pat. No. 3,526,492 discloses a glass premelting furnace wherein batch materials enter and exhaust gases leave through a common duct.

In the article entitled "Control of Emissions From Glass Manufacture" by Aaron J. Teller, published in the CERAMIC BULLETIN vol. 50, No. 8 (1972), is disclosed wet and dry scrubber systems for recovering emissions from glass melting furnaces. In the dry scrubber system, a finely divided reactive carrier containing a molecular layer of a special chromatographic material is mixed with the furnace effluent gases which have been cooled to 150° to 250°F. to adsorb acidic gases therefrom. The mixture is then passed through a baghouse when the solids are separated and then processed for recovery, disposal, or reuse. While this complex combination of a reactive carrier and chromatographic material is said to adsorb the acidic gases from the furnace effluent, the method is burdened with special processing of rather expensive reagents. Furthermore, since this proposal does not react the glass batch itself with the sulfur-containing gases, no refining advantages are realized. The sulfur is merely adsorbed on the surface layer of the carrier at 150°F. to 250°F.

In another approach, panel bed reaction chambers for removal of fly ash and sulfur dioxide have been proposed by A. M. Squires and R. A. Graff in the paper entitled "Panel Bed Filters for Simultaneous Removal of Fly Ash and Sulfur Dioxide" presented at the 63rd Annual Meeting of the Air Pollution Control Association in St. Louis, Mo., June 14-18, 1970. This proposal does not concern the use of agglomerated glass batch materials for the removal of sulfur from effluent gases.

It is apparent that the prior art as represented by the foregoing recognize the concept of preheating incoming batch materials (whether agglomerated or not) by countercurrent heat exchange with combustion exhaust gases for the purpose of fuel economy. There is no recognition in the art that agglomerated batch can be reacted and preheated with the $SO_x$-containing effluent gas to recover sulfur therefrom in the form of an in situ reaction product which facilitates melting and refining of the batch at lower temperatures. Accordingly, the present invention provides a method for efficient batch melting, fuel economy, and pollution abatement in glass melting operations which are fired by combustion fuels.

In the melting and refining of soda-lime glass, it is common practice to introduce sulfur (as sulfate) in the proportion of about 0.05 to about 0.6% of the resulting molten glass and typically 0.4% (when reported as $SO_3$) by weight of the glass batch for flint glass and green glass. Due to prevailing chemical equilibrium, flint and green soda-lime glasses do not have the capacity to retain all of the sulfur introduced. This means that in the typical case a significant proportion of the sulfur introduced (i.e., 0.4% minus 0.3%) leaves the glass furnace with the exhaust gas as $SO_x$ (i.e., $SO_2$ and/or $SO_3$). Conventional amber soda-lime glasses can retain about 0.005 to 0.04% by weight of sulfur when reported as $S^{--}$ and sulfur losses are also a problem with these glasses. The present invention provides a method for recovering such sulfur from the exhaust gas as well as substantially lowering the glass melting and refining temperatures. As a result of this lowering of the melting and refining temperatures, the tendency for generation of other objectionable materials in the exhaust gas such as the oxides of nitrogen (commonly referred to as $NO_x$) and particulates is decreased.

Accordingly, the present invention provides an improvement in the melting of agglomerates of alkaline glass batch ingredients in a combustion heated, continuous, glass melting furnace to yield molten glass and combustion exhaust gas, wherein batch ingredients are continuously fed to the furnace and molten glass continuously issues therefrom, wherein the total sulfur supplied to the glass melting furnace in the batch ingredients and combustion fuel is in excess of the total sulfur leaving the furnace in the glass and such excess sulfur is present in the exhaust gas as $SO_x$. The specific improvement provides for recovering said excess sulfur from the exhaust gas while simultaneously lowering the glass melting and refining temperatures comprising the steps of contacting the agglomerates with the exhaust gas at a temperature and for a time sufficient to remove as an in situ reaction product with said agglomerates at least about 90% by weight of the combined sulfur initially present in said exhaust gas, said reaction product containing combined sulfur in a form which facilitates glass refining, said contact being at a temperature and for a time insufficient for substantially fusing said agglomerates to the point where the batch will not flow readily through equipment and handling becomes a problem.

The agglomerated batch, being alkaline in nature, reacts with the acid $SO_2$ and $SO_3$ components in the exhaust gas to form a reaction product which remains in the agglomerated batch. The reacted agglomerates are then separated from the exhaust gas and charged to the glass melting furnace where it is melted and refined. The agglomerates can be melted and refined at lower temperatures (e.g., 100°F. to 200°F.) than if they had not been prereacted and preheated with the exhaust gas.

The prereacted and preheated agglomerates are then melted and refined in the usual manner to yield molten glass. The sulfur content of the molten glass is established from past operational data or by chemical analysis and the total sulfur content of the agglomerated batch is adjusted (per unit weight of molten glass) prior to contact with the exhaust gas to contain substantially the same amount of sulfur per unit weight of molten glass issuing from the furnace. The term "substantially the same" has been used above because the present invention envisions the recovery of at least about 90% by weight of the total sulfur in the exhaust gas. In some cases, it may be necessary to include a slight excess of sulfur in the batch over that leaving in the glass to account for this slight loss. In the preferred case, no excess sulfur is required in the batch.

Preparation of the Agglomerated Glass Batch

Soda-lime glasses (i.e., those glasses in the $Na_2O$-$CaO$-$SiO_2$ system with or without minor proportions of alumina and other alkali oxides and alkaline earth oxides) are by far the most commercially significant embodiment of the present invention insofar as glass containers and flat glass manufacture is concerned. Soda-lime glasses used in practicing present invention can be prepared from conventional fritted and unfritted batch ingredients such as lime, soda ash, sand, borax, feldspar, nepheline syenite, magnesium carbonate, potassium carbonate, iron oxide, dolomite, sodium silicate, sodium hydroxide, potassium hydroxide, potash, fluorspar, barium carbonate, limestone, alumina, silica, and cullet in various proportions, depending upon the composition and color desired. Conventional sulfur sources, e.g., salt cake (sodium sulfate), gypsum ($CaSO_4 \cdot 2H_2O$), or slag, can be used as a source of supplemental sulfur in the batch material to make up the sulfur which leaves the system with the molten glass or exhaust gas. The above and other ingredients are all commonly known in the glassmaking art, and conditions and procedures for making flint, green and amber glasses therefrom are conventional as illustrated in Volume 1 of the "Handbook of Glass Manufacture" by Tooley, Ogden Publishing Company, New York, N.Y. (1953) and Chapter 7 of "Glass Engineering Handbook" edited by E. B. Shand, Second Edition, McGraw-Hill Book Company, Inc., New York, N.Y.

(1958), the disclosures of which are incorporated by reference.

Such soda-lime silica glasses are usually within the composition field:

| | |
|---|---|
| $SiO_2$ | 60 – 75 % |
| $Al_2O_3$ | 0 – 15 |
| CaO | 5 – 20 |
| MgO | 5 – 20 |
| $B_2O_3$ | 0 – 15 |
| $Na_2O$ | 10 – 20 |
| $K_2O$ | 0 – 5 |
| $Li_2O$ | 0 – 5 |
| BaO | 0 – 5 |

In the production of glass containers, a glass composition as above is melted in a glass melting tank of up to several hundred tons glass melting capacity. The batch constituents are added and proceed through the tank under melting and refining condition. The glass is issued out of the fining end of the melting tank by being run through one or a plurality of forehearths which are provided in connection with the tanks to feed the forming machines.

In the regard the batch materials soda ash, lime (including dolomite lime) and sand, with or without small amounts of feldspar or nepheline syenite, are usually used in the manufacture of soda-lime glass and will be discussed in detail in the examples.

The term "agglomerate" includes any composite, integral, self-supporting mass of batch materials. The glass batch materials can be agglomerated in the form of balls, extrusions, disks, briquettes, pellets, granules or other geometric shapes of formed, compacted, mixed glass batch ingredients by conventional techniques. For example, the powdered batch materials are thoroughly mixed such as by dry mixing process and then agglomerated to pellets having a particle size in the range of about 0.1 inch in diameter to about 1 inch in diameter, usually about 0.2 to 0.6 inches in diameter, by subjecting the powder to a tumbling action causing them to roll over one another repeatedly in the presence of water (with or without binding agents) in a pelletizing equipment such as ball-mill, a spinning disk, rotary drum, or double cone type, of blending device. Calcined alkaline earth oxides such as calcineddolomite or calcined limestone are often used as a batch material to provide hydrate bonding in the pellets. The pellets are then dried to remove the water thereby providing a raw material change for glassmaking furnaces in a form which is readily reactable with the sulfur-containing effluent gases. Binding material such as aqueous solutions of potassium hydroxide, clays or sodium silicate can be employed in the proportion of 0.1 to about 25% by weight of this batch if desired. Brequettes can be formed from the above ingredients by a compaction process if desired. The agglomerates thus formed are compact. Integral agglomerates which are strong enough to withstand handline and processing.

The drying of the pellets of the agglomerated particles for the removal of moisture by evaporation must be effected at initially moderate temperatures above 100°F. and below 1,000°F. by means of heated air or in an oven. Care must be taken to avoid fusing the pellets together. While it is true that care must be taken not to dry pellets too fast, or to expose wet pellets to too high a temperature before drying to prevent decrepitation of the wet pellets, the wet pellets can be passed directly to the heat exchange and reaction process where both drying and reaction take place. Both of the above processes result in well-rounded pellets of agglomerated particles having an average diameter usually between 0.2 inch and 0.6 inch and a bulk density of about 50 to 100 $lb/ft^3$ and individual pellet density of 100 to 200 $lb/ft^3$. Other methods of forming agglomerates are well-known in the art as represented by U.S. Pat. Nos. 3,542,534 and 2,062,907, the disclosures of which are incorporated by reference.

The Heat Exchange and Reaction Process

The agglomerated alkaline glass batch in either the wet or dry state is contacted in a counter-current heat exchange and reaction process with the sulfur oxide-containing exhaust gas from a combustion fired glass melting furnace. Prior to introducing the agglomerated batch to the glass melting furnace, the batch is agglomerated to provide a composite agglomerate of the batch ingredients. The use of agglomerates prevents fluid classification of individual components during contact with the exhaust gas. More importantly, the agglomerates are preheated and react in situ with the $SO_x$ in the exhaust gas to form sulfur compounds such as sulfates, sulfides or sulfites in the agglomerates. Each agglomerate thus becomes a prereacted mixture of sulfur and batch materials which easily melt and refine at lower temperatures.

Another advantage of this technique is that a substantial portion of the particulates in the exhaust gas can become occluded on the agglomerates. The net result is that sulfur and particulates can be stripped from the exhaust gas by contact with the incoming agglomerated batch.

Upon leaving the glass melting furnace, the temperature of the exhaust gas is typically 2,500° to 2,800°F. and contains up to about 500 ppm of $SO_x$ (i.e., combined $SO_2$ and $SO_3$), up to about 1,500 ppm of $NO_x$ (i.e., combined oxides of nitrogen) and up to about $0.3 \times 10^{-2}$ grams of particulates per standard cubic foot.

Prior to contact with the agglomerated batch, these exhaust gases can be passed through a conventional heat exchange apparatus such as regenerator or recuperator to recover heat for preheating combustion air as is shown in Chapter 7 of "Glass Engineering Handbook" mentioned above. Upon leaving a regenerator, the temperature of the exhaust gas is about 1,000° to 1,500°F. Alternately, the exhaust gases can be passed directly from the glass melting furnace to the heat exchange and reaction step as shown by the dotted line in the drawing. In this case, the contact time between the batch and the gases is reduced to allow for the greater heat content of the gases.

In either case, the exhaust gas is countercurrently contacted with the agglomerates at a temperature and for a time sufficient to strip at least 90% by weight and preferably all of the measurable $SO_x$ from the gas as an in situ reaction product with the agglomerates, but at a temperature and for a time insufficient to fuse substantial amount of the agglomerates. The agglomerates usually will start to fuse together when their temperature reaches about 1,400°F. to 1,500 F. so contact is usually discontinued while the agglomerates are below this temperature.

The agglomerated glass batch is charged to a reaction chamber such as a moving bed or a fixed bed reactor countercurrent to the flow of effluent gases from the glass melting furnace where they serve as a filtering medium for a substantial portion of particulate material in the effluent gases. Cocurrent reactors can also be used if desired although countercurrent flow is presently preferred. The batch materials, principally the alkali and alkaline-earth components, react effectively with the $SO_x$ in the effluent gases to form in situ sulfur compounds such as sulfates or sulfites in the agglomerates. The reaction chamber can be of the "shaft reactor" type comprising a vertical cylindrical chamber equipped with an inverted conical bottom. The agglomerated batch is fed either continuously or on an intermittent basis through an inlet near the top and leaves the chamber through the conical bottom. The effluent gas enters the chamber through an inlet near the bottom and leaves through an outlet at the top after passing through the bed of agglomerated batch.

The reaction chamber can also be of the moving bed type wherein the effluent gas is passed through a bed of agglomerates on a "grate-like" support. Other reactor designs are known to those skilled in the art and selection thereof forms no part of the present invention.

The reaction begins in the outer surface of the agglomerate and proceeds inwardly towards the core of the agglomerate as the reaction proceeds. Visual examination of the particle which has been partially reacted indicates that the reacted portion has been expanded and can be easily distinguished from the non-reacted inner core. The contact time and temperature in the reactor are maintained to assure that at least about 90% by weight and preferably all of the measurable sulfur is removed from the effluent gas. Typically, the contact time varies from a few minutes up to one-half hour and longer.

After reaction with the effluent gases, the sulfur content of the agglomerates is established from past operational data or chemical analysis. The sulfur content of the incoming agglomerated glass batch is controlled to maintain a balance between the total sulfur input in the batch and total sulfur output in the molten glass per unit weight of molten glass. By this technique, the sulfur not assimilated by the molten glass is effectively recycled between the effluent gases and the agglomerated glass batch and is not allowed to escape to the atmosphere. For instance, in a typical flint glass situation according to the present invention, the overall sulfur balance (as weight % $SO_3$) will be:

| | |
|---|---|
| Sulfur in molten glass | 0.3% |
| Sulfur in exhaust gas leaving furnace | 0.1% |
| Sulfur in exhaust gas leaving heat exchanger and reactor | 0.0 up to 0.01% |
| Sulfur in agglomerated batch going into heat exchanger and reactor | 0.3 up to 0.31% |
| Sulfur in agglomerated batch leaving heat exchanger and reactor and feeding to glass melting furnace | 0.4% |

The attendant advantages of this technique are a lowering of the glass furnace operating temperature by 100° to 200°F., reduction in the $NO_x$ as a result of the lowering of the flame temperature in the glass melting furnace and lowering of the particulates in the effluent gas due to volatilization.

The agglomerated batch becomes "sulfur-enriched" in this reaction and contains sulfur in a form such that it is more readily melted and refined to a molten glass than a glass batch which has not been reacted with exhaust gases. This sulfate-enrichment allows for reduction in the operating temperature of the glass melting furnace by 100°F. to 200°F. This reduction in furnace temperature decreases the rate of generation of the oxides of nitrogen, as well as decreasing the amount of particulate material from alkali oxides volatilized from the molten glass.

In that the sulfur is removed from the exhaust gas with the incoming agglomerated batch, the sulfur is in effect recycled to the glass melting furnace. Accordingly, it is possible to reduce the amount of sulfur added with glass batch materials. The net effect is that sulfur emissions are substantially reduced or, in fact, eliminated in many applications so that it is no longer necessary to resort to chemical scrubbers and other techniques for recovering sulfur from the exhaust gas.

The principles of the present invention are applicable to any glass batch material which is alkaline in nature and is capable of reaction with the sulfurous components in the exhaust gas. Since virtually all glass batches are alkaline in nature in that they contain alkali oxides, alkaline earth oxides, or their precursor materials, such as soda ash, and limestone, the invention has utility throughout the glass melting arts. The most specific application for the present invention will be in the field of soda-lime glass because of the widespread commercial manufacturing facilities for such glasses.

The invention will be more fully understood with reference to the drawing which is a schematic flow diagram illustrating the principles of present invention in conjunction with the examples that follow.

In the examples that follow, all parts are parts by weight, all percentages are weight percentages, and all temperatures are in degrees Fahrenheit unless stated otherwise.

EXAMPLE 1

PART A

Preparation of the Agglomerates

The following proportions of batch ingredients, all having a particle size passing a 40 mesh screen, are dry blended together.

| BATCH INGREDIENT | PARTS |
|---|---|
| Sand | 2,000 |
| Soda ash | 640 |
| Limestone | 588 |
| Feldspar | 238 |
| Blast furnace slag | 32 |
| Salt cake | 25 |
| Cullet (same composition as results from this batch) | 833 |

The theoretical yield of $SO_3$ of this batch is 0.34% of this glass composition. The batch is then formed into pellets by slowly tumbling in a conventional rotary drum pelletizer together with about 10 parts of water per 100 parts of batch until pellets of about one-half inch diameter are formed. The pellets are then dried by slowly heating to about 350°F. to 400°F.

The pellets thus formed have an average diameter of one-half inch, are hard, compact, and crush-resistant, and have a bulk density of about 110 to about 120 pounds per cubic foot.

PART B

Glass Melting and Refining — Control

The pellets formed in Part A are fed to a continuous, gas fired, glass melting and refining furnace equipped with a standard pair of regenerators for heating combustion air. The furnace is operated by conventional procedures (i.e., without preheating and prereacting the pellets with the exhaust gas) as described in Chapter 7 of "Glass Engineering Handbook." When steady state operation is achieved, the furnace yields molten flint glass having a composition of:

| COMPONENT | % BY WEIGHT |
|---|---|
| $SiO_2$ | 72.7 |
| $Al_2O_3$ | 1.7 |
| CaO | 11.3 |
| MgO | 0.2 |
| $Na_2O$ | 13.4 |
| $K_2O$ | 0.3 |
| $SO_3$ | 0.20 (actual) |

The glass melting surface temperature is about 2,750°F.

The temperature of the exhaust gas leaving the glass melting furnace and flowing to the regenerator is 2,750°F. and the composition is:

| | |
|---|---|
| $CO_2$ | 12.3% |
| $H_2O$ | 16.1% |
| $N_2$ | 69.1% |
| $O_2$ | 2.4% |
| $SO_x$ | 300 ppm (parts per million) |

Upon leaving the regenerator, the temperature of the exhaust gas is about 1,400°F. and the composition is essentially unchanged.

Under these conditions, a substantial amount of the sulfur introduced into the glass melting furnace (i.e., 0.34% minus 0.20%) is present in the exhaust gas.

PART C

Glass Melting and Refining by Inventive Process

The glass melting furnace of Part B is then operated according to the inventive process as outlined schematically in the drawing. The agglomerated latch (i.e., the pellets of Part A), designated stream 10 is at room temperature and is continuously fed countercurrently to the flow of warm exhaust gas stream 15 to direct heat exchanger and reactor. The heat exchange and reactor is an upright cylindrical chamber with a conical bottom having a pellet inlet and a gas outlet at the top and a pellet outlet and gas inlet at the bottom.

The temperature of stream 15 is 1,400°F. and the composition is:

| | |
|---|---|
| $CO_2$ | 12.3% |
| $H_2O$ | 16.1% |
| $N_2$ | 69.1% |
| $O_2$ | 2.4% |
| $SO_x$ | 300 ppm |

While in the heat exchanger and reactor, the pellets and warm exhaust gas stream 15 are intimately contacted for a time sufficient so that the cool exhaust gas stream 16 leaving the heat exchanger and reactor to a temperature of about 500°F. The resulting composition of stream 16 is:

| | |
|---|---|
| $CO_2$ | 8.6% |
| $H_2O$ | 16.8% |
| $N_2$ | 72.0% |
| $O_2$ | 2.6% |
| $SO_x$ | no detectable amount (i.e., less than 15 ppm) |

Under the reaction conditions, the pellets in stream 11 have been warmed to about 1,300°F. and have a sulfur content theoretically yielding a glass composition containing about 0.48% $SO_3$ (i.e., 0.34% from batch plus 0.14% recovered from warm exhaust gas stream 15). The recovered 0.14% $SO_3$ is present as an in situ reaction product and not merely sorbed on the pellet surface.

The salt cake content of the batch is lowered from 25 parts to 14.3 parts so that equilibrium is maintained and batch theoretically yields a glass containing 0.20% $SO_3$.

Thus, at steady state the following conditions exist based on yield of molten glass:

| | |
|---|---|
| $SO_3$ in molten glass | 0.2% |
| $SO_3$ in warm exhaust gas stream 15 | 0.14% |
| $SO_3$ in cool exhaust gas stream 16 | no detectable amount |
| $SO_3$ in agglomerated glass batch stream 10 | 0.2% |
| $SO_3$ in agglomerated glass batch stream 11 | 0.34% |

Stream 11 is fed to the glass melting furnace as described in Part B while continuous operation is maintained as in the drawing. When steady state operating conditions are established, the glass melting surface temperature is about 2,600°F. or less. The glass composition remained as described in Part B and the composition and temperature of streams 14 and 15 are essentially as described in Part B. Thus, it is demonstrated that the present invention recovers and re-uses sulfur from the exhaust gas while lowering the temperature at which glass melting and refining can be achieved.

Substantially similar results are obtained when the procedures of Part C are repeated except that the warm exhaust gas stream 15 and agglomerated batch stream 10 are contacted in a moving bed type of reactor wherein the stream 15 passes through a bed of pellets on a "grate-like" support until the reaction conditions described in Part C are obtained.

Substantially similar results are also obtained in the procedures of Part C when the agglomerated batch is in the form of compacted briquettes rather than pellets are used.

Substantially similar results are also obtained when the pellets formed in Part A are fed directly to the countercurrent heat exchanger and reactor without first being dried.

In a modification of the procedures of Part C, the hot exhaust gas stream can be passed directly to the countercurrent heat exchanger and reactor without first passing through the indirect heat exchanger. This modification is indicated by a dotted line 14a in the drawing. According to this modification, the contact time in the countercurrent heat exchange and reactor should be shortened to allow for the greater heat content of stream 14a.

EXAMPLE 2

The procedures of Part C of Example 1 are repeated except that the glass is an amber glass prepared under reducing conditions from the following batch ingredients:

| BATCH INGREDIENTS | PARTS |
|---|---|
| Yellow sand | 2,000 |
| Soda ash | 702 |
| Limestone | 491 |
| Feldspar | 270 |
| Blast furnace slag | 126 |
| Iron pyrites | 5.8 |
| Iron scale | 1.8 |
| Sea coal (carbon) | 1.4 |

This batch theoretically yields an amber glass having $S^{--}$ content of 0.09%. The batch is pelletized according to procedures of Examples 1 and melted and refined under conventional reducing conditions as employed for amber glass.

The resulting amber glass has a composition:

| COMPONENT | % BY WEIGHT |
|---|---|
| $SiO_2$ | 72.1 |
| $Al_2O_3$ | 2.2 |
| $Fe_2O_3$ | 0.3 |
| CaO | 10.4 |
| MgO | 0.6 |
| $Na_2O$ | 13.9 |
| $K_2O$ | 0.4 |
| $S^=$ | 0.02 (actual) |

Under these conditions, a substantial amount of the sulfur introduced into the glass melting furnace (i.e., 0.09% minus 0.02%) is present in the exhaust gas.

When the exhaust gases are contacted with the agglomerated batch by the procedure described in Example 1, Part C, substantially all of the sulfur is recovered from the exhaust gas in the form of an in situ reaction product in the agglomerated batch. This allows for a corresponding adjustment in the sulfur content of the batch. It is also possible to lower the glass melting surface temperatures by about 150°F.

EXAMPLE 3

The procedures of Example 1 are repeated except that the glass is an emerald green glass prepared from the following batch ingredients:

| BATCH INGREDIENTS | PARTS |
|---|---|
| Sand | 2,000 |
| Soda ash | 726 |
| Limestone | 577 |
| Feldspar | 158 |
| Blast furnace slag | 80 |
| Salt cake | 30 |
| Iron chromite | 28 |

This batch theoretically yields an emerald green glass having an $SO_3$ content of 0.54% by weight. The batch is pelletized according to procedures of Example 1 and melted and refined under conventional conditions as employed for emerald glass.

The resulting amber glass has a composition:

| COMPONENT | % BY WEIGHT |
|---|---|
| $SiO_2$ | 70.3 |
| $Al_2O_3$ | 1.5 |
| $Fe_2O_3$ | 0.3 |
| CaO | 11.5 |
| MgO | 0.5 |
| $Na_2O$ | 14.8 |
| $K_2O$ | 0.2 |
| $Cr_2O_3$ | 0.23 |
| $SO_3$ | 0.37 |

Under these conditions, a substantial amount of the sulfur introduced into the glass melting furnace (i.e., 0.54% minus 0.37%) is present in the exhaust gas.

When the exhaust gases are contacted with the agglomerated batch by the procedure described in Example 1, Part C, substantially all of the sulfur is recovered from the exhaust gas in the form of an in situ reaction product in the agglomerated batch. This allows for a corresponding adjustment in the sulfur content of the batch. It is also possible to lower the glass melting surface temperatures by about 150°F.

Having thus described the invention, what is claimed is:

1. In the method for melting agglomerates of soda-lime, glass batch ingredients in a combustion heated, continuous, glass melting furnace to yield glass and combustion exhaust gas, wherein batch ingredients are continuously fed to the furnace and molten glass continuously issues therefrom, and wherein the total combined sulfur supplied to the glass melting furnace in the batch ingredients and combustion fuel is in excess of the total combined sulfur leaving the furnace in the gases, and such excess sulfur is present in said exhaust gas as $SO_x$, the improvement for recovering said excess sulfur while simultaneously lowering the glass melting and refining temperatures comprising the steps of:

contacting said agglomerates with said exhaust gas at a temperature and for time sufficient to remove as an in situ reaction product with said agglomerates at least about 90% by weight of the combined sulfur initially present in said exhaust gas, said reaction product containing combined sulfur in a form which facilitates glass refining, said contact being at a temperature and for a time insufficient for fusing said agglomerates, separating the resulting reacted agglomerates from said exhuast gas, charging said reacted agglomerates to said glass melting furnace, and maintaining the amount of sulfur in said agglomerates, prior to contacting said agglomerates with said exhaust gas, to be substantially the same as the amount of sulfur issuing from the furnace per unit weight of molten glass.

2. The method of claim 1, wherein said exhaust gas is used to preheat combustion air for said furnace prior to contact with said agglomerates.

3. The method of claim 2 wherein said exhaust gas contacting said agglomerates is in the temperature range of 1,000°F. to 1,500°F.

4. The method of claim 1, wherein the temperature of said agglomerates does not exceed about 1,500°F. during contact with said exhaust gas.

5. The method of claim 1 wherein said glass is a soda-lime-silica glass.

6. The method of claim 5 wherein said soda-lime-silica glass is flint glass.

7. The method of claim 5 wherein said soda-lime-silica glass is a green glass.

8. The method of claim 5 wherein said soda-lime-silica glass is an amber glass.

9. The method of claim 1 wherein all of said sulfur is removed from said exhaust gas.

10. The method of claim 1 wherein said glass melting and refining temperatures are lowered by about 100°F. to about 200°F.

* * * * *